United States Patent
Chung et al.

(10) Patent No.: US 8,275,176 B2
(45) Date of Patent: Sep. 25, 2012

(54) METHOD AND APPARATUS FOR USER AUTHENTICATION USING FACE IMAGE

(75) Inventors: Yun-Su Chung, Daejeon (KR); Jin Choi, Daejeon (KR); Jang-Hee Yoo, Daejeon (KR); Kyo-Il Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 968 days.

(21) Appl. No.: 12/298,229

(22) PCT Filed: Apr. 25, 2007

(86) PCT No.: PCT/KR2007/002017
§ 371 (c)(1),
(2), (4) Date: Oct. 23, 2008

(87) PCT Pub. No.: WO2007/123368
PCT Pub. Date: Nov. 1, 2007

(65) Prior Publication Data
US 2009/0097717 A1    Apr. 16, 2009

(30) Foreign Application Priority Data

Apr. 26, 2006    (KR) .................. 10-2006-0037758

(51) Int. Cl.
*G06K 9/00* (2006.01)
(52) U.S. Cl. ........ 382/118; 382/103; 382/190; 382/286; 382/305
(58) Field of Classification Search .................. 382/181; 411/173, 179, 181, 500, 501
See application file for complete search history.

(56) References Cited

U.S. PATENT DOCUMENTS

| | | | |
|---|---|---|---|
| 5,987,459 A * | 11/1999 | Swanson et al. | 1/1 |
| 6,292,575 B1 * | 9/2001 | Bortolussi et al. | 382/118 |
| 7,062,093 B2 * | 6/2006 | Steger | 382/216 |
| 7,130,454 B1 * | 10/2006 | Berube et al. | 382/118 |
| 7,203,381 B2 * | 4/2007 | Motomura et al. | 382/299 |

(Continued)

FOREIGN PATENT DOCUMENTS

EP    1411459 A1    4/2004

(Continued)

OTHER PUBLICATIONS

Jing, Xiao-Yuan et al., "A Face and Palmprint Recognition Approach Based on Discriminant DCT Feature Extraction," *IEEE Transactions on Systems, Man and Cybernetics—Part B: Cybernetics*, vol. 34(6):2405-2415 (2004). International Search Report for Application No. PCT/KR2007/002017, dated Aug. 8, 2007.

*Primary Examiner* — Vu Le
*Assistant Examiner* — Aklilu Woldemariam
(74) *Attorney, Agent, or Firm* — Nelson Mullins Riley & Scarborough LLP; EuiHoon Lee, Esq.

(57) ABSTRACT

A user authentication method and apparatus using a face image are provided. The method includes transforming a face image in a normalized spatial domain into frequency-domain data, extracting valid transform coefficients from the frequency-domain data based on energy-concentrated region information, extracting a feature vector from the extracted valid transform coefficients, and performing user authentication by comparing the extracted feature vector with a previously registered feature vector. Accordingly, it is possible to perform user authentication using a face image while using a minimum data dimension, thereby improving the speed and precision thereof.

13 Claims, 5 Drawing Sheets

U.S. PATENT DOCUMENTS

| | | | |
|---|---|---|---|
| 7,352,910 B2 * | 4/2008 | Kanamori et al. | 382/254 |
| 2003/0059124 A1 * | 3/2003 | Center, Jr. | 382/278 |
| 2004/0243567 A1 * | 12/2004 | Levy | 707/3 |
| 2006/0115176 A1 * | 6/2006 | Kanamori et al. | 382/266 |
| 2010/0150452 A1 * | 6/2010 | Kamei | 382/202 |
| 2011/0317872 A1 * | 12/2011 | Free | 382/103 |

FOREIGN PATENT DOCUMENTS

| | | |
|---|---|---|
| JP | 2006-012130 | 1/2006 |
| KR | 1020000060673 | 10/2000 |
| KR | 1020040086252 | 10/2004 |
| KR | 1020050060628 | 6/2005 |
| WO | WO-2007/123368 A1 | 11/2007 |

* cited by examiner

FIG. 3

| 600 | 311 | 196 | 167 | 166 | 149 | -523 | 13 | -234 | 19 | -316 | -29 | -131 | -23 | -136 | ⋯ |
|---|---|---|---|---|---|---|---|---|---|---|---|---|---|---|---|
| 850 | 238 | -250 | 163 | 269 | 115 | -508 | 12 | -143 | 10 | -157 | -33 | -159 | -12 | -124 | ⋯ |
| -749 | -151 | -220 | -25 | 221 | -73 | -318 | 2 | -95 | -63 | -89 | -108 | -116 | -74 | -10 | ⋯ |
| -461 | -83 | 169 | 64 | -290 | 74 | 136 | 30 | -68 | -46 | 60 | 30 | 56 | -16 | 98 | ⋯ |
| 410 | 30 | -279 | -43 | -525 | -88 | 65 | -13 | 19 | -65 | 85 | -31 | 79 | -33 | 125 | ⋯ |
| 471 | 26 | -243 | -122 | -286 | -48 | -154 | -135 | 86 | 9 | 9 | -19 | -46 | -46 | 130 | ⋯ |
| 262 | 103 | -178 | 33 | 78 | 63 | 150 | 90 | -22 | 26 | 12 | 7 | 118 | 81 | 34 | ⋯ |
| -178 | -28 | -279 | -121 | -10 | -24 | -268 | -60 | -71 | -78 | -8 | -24 | 13 | -7 | -47 | ⋯ |
| -291 | 50 | 167 | 122 | 146 | 1 | -100 | 11 | -13 | 10 | 71 | 20 | -79 | -23 | -23 | ⋯ |
| 246 | -15 | -283 | -69 | 105 | -6 | 64 | 39 | -51 | 2 | 9 | -29 | 49 | 40 | 59 | ⋯ |
| 331 | 21 | -39 | -52 | 151 | 84 | -70 | -2 | -59 | -45 | 43 | 18 | 35 | -22 | -28 | ⋯ |
| -390 | -92 | 158 | 99 | -139 | -45 | 26 | 9 | -56 | 36 | 13 | -13 | 123 | 34 | 2 | ⋯ |
| 415 | 44 | -151 | -42 | -102 | 53 | 28 | 23 | -112 | -49 | 41 | 13 | 2 | -21 | 19 | ⋯ |
| 197 | 1 | -43 | -1 | -150 | 8 | -75 | -46 | 24 | -9 | 50 | 35 | 19 | -17 | 47 | ⋯ |
| 127 | 49 | 83 | 25 | -115 | -49 | 54 | 0 | 104 | 16 | -82 | -43 | 73 | 23 | 5 | ⋯ |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋱ |

METHOD AND APPARATUS FOR USER AUTHENTICATION USING FACE IMAGE

TECHNICAL FIELD

The present invention relates to a method and apparatus for user authentication using a face image, and more particularly, to a user authentication method and apparatus in which a feature vector is extracted from a face image based on the characteristics of the face image that energy is concentrated with respect to specific transform coefficients, and user authentication is performed by comparing the extracted feature vector with a registered feature vector in order to determine a similarity therebetween, thereby improving the speed and precision of the user authentication while using a minimum data dimension.

BACKGROUND ART

To recognize a face, a feature vector for identifying an individual person needs to be extracted from an image of the face. In general, a local characteristics-based method or a global characteristics-based method is used to extract a feature vector from a face image.

In the local characteristics-based method, a feature vector is extracted using the shapes and locations of and the relationship between characteristic parts (eyes, nose, mouth, etc.) of a face. In the global characteristics-based method, a feature vector is extracted using all the parts of a face. In detail, the global characteristics method includes a Principal Component Analysis (PCA) method and a Linear Discriminant Analysis (LDA) method.

DISCLOSURE OF INVENTION

Technical Problem

However, conventionally, in the PCA method and the LDA method, the whole face image is projected onto a transform matrix, thus increasing a data dimension and the computational complexity. Accordingly, it is difficult to expect these methods to perform well in terms of speed or precision. Furthermore, there is a restriction to represent a partial characteristic of a face since the whole face image is used as the characteristics of the face.

Technical Solution

The present invention provides a user authentication method and apparatus using a face image, in which a feature vector is extracted based on the characteristics of the face image that energy is concentrated with respect to specific transform coefficients and user authentication is performed by comparing the extracted feature vector with a registered feature vector in order to determine a similarity therebetween.

Advantageous Effects

In a user authentication method and apparatus using a face image according to the present invention, a feature vector of the face image is extracted by using valid transform coefficients each representing a high energy concentration, thereby reducing a data dimension and the computational complexity. Furthermore, it is possible to efficiently perform user authentication in terms of speed and precision.

DESCRIPTION OF DRAWINGS

FIG. 3 is a 15'15 table illustrating values obtained by performing a discrete cosine transform (DCT) operation on a normalized image applied to the user authentication apparatus of FIG. 1 and rounding off the operation result to a first decimal place according to an embodiment of the present invention;

BEST MODE

According to an aspect of the present invention, there is provided a user authentication method using a face image, the method comprising (a) transforming a face image in a normalized spatial domain into frequency-domain data; (b) extracting valid transform coefficients from the frequency-domain data, based on energy-concentrated region information; (c) extracting a feature vector from the extracted valid transform coefficients; and (d) performing user authentication by comparing the extracted feature vector with a previously registered feature vector.

According to another aspect of the present invention, there is provided a user authentication apparatus using a face image, the apparatus comprising a frequency converting unit transforming a face image in a normalized spatial domain into frequency-domain data; a valid transform coefficient extracting unit extracting valid transform coefficients from the frequency-domain data based on energy-concentrated region information; a feature vector extracting unit extracting a feature vector from the extracted valid transform coefficients; and a user authentication unit performing user authentication by comparing the extracted feature vector with a previously registered feature vector.

According to another aspect of the present invention, there is provided a method of extracting an energy-concentrated region, the method comprising computing energy probabilities in individual face images with respect to a plurality of prior training face images which are transformed into frequency-domain data; computing an energy probability map of the face images by selecting some of the energy probabilities, which are equal to or greater than a predetermined value; and extracting a energy-concentrated region having transform coefficients that have a high degree of redundancy by using the energy probability map of the face images.

According to another aspect of the present invention, there is provided a computer readable medium having recorded thereon a computer program for executing a user authentication method using a face image.

The above and other aspects and advantages of the present invention will become more apparent by describing in detail exemplary embodiments thereof with reference to the attached drawings.

Mode for Invention

Hereinafter, exemplary embodiments of the present invention will be described in detail with reference to the accompanying drawings.

Figure 1:
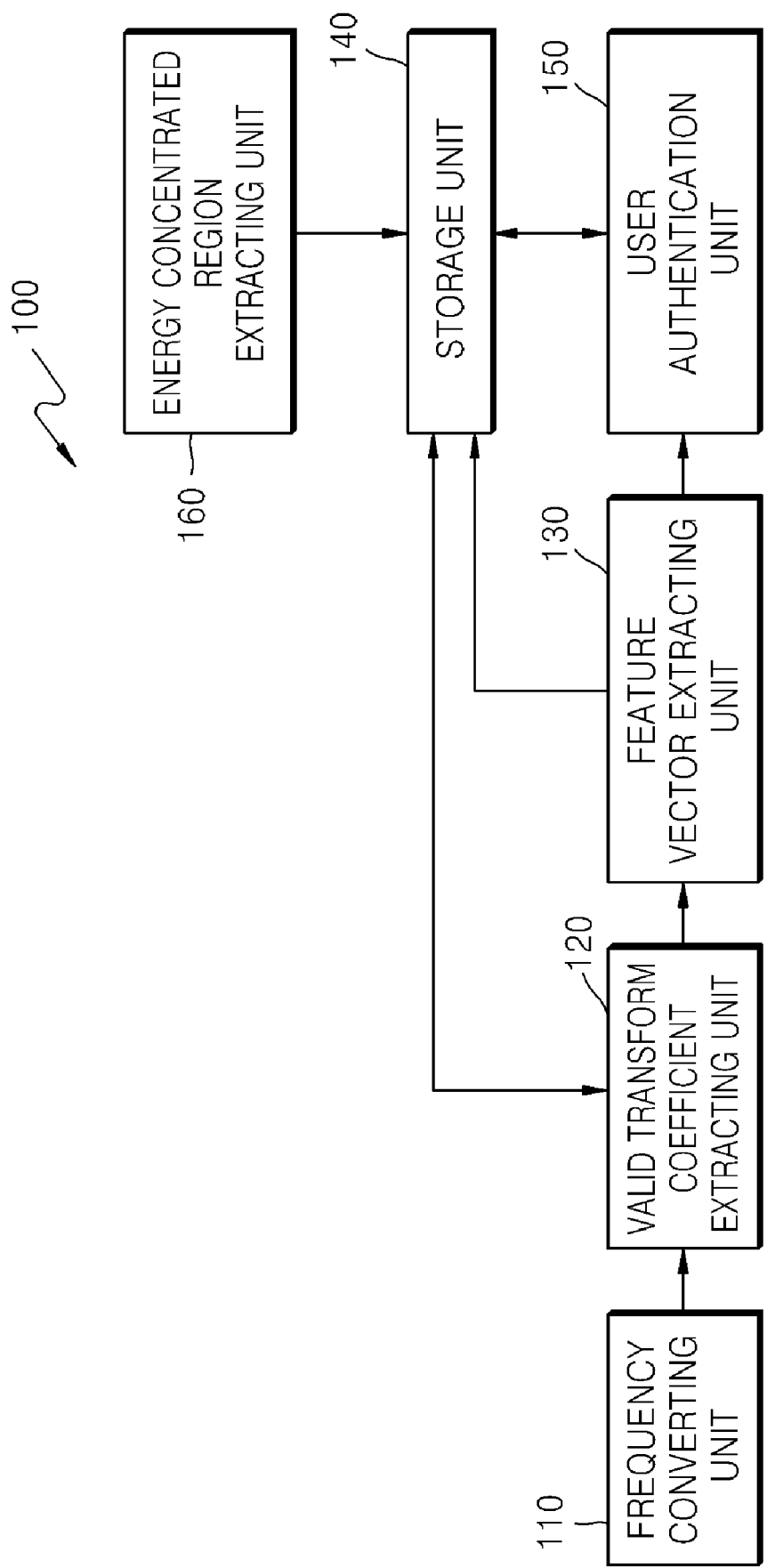
FIG. 1 is a block diagram of a user authentication apparatus according to an embodiment of the present invention.

FIG. 1 is a block diagram of a user authentication apparatus 100 using a face image according to an embodiment of the present invention.

In general, the eyes, nose, and mouth, which are major constitutional elements of a face, show strong horizontal frequency characteristics. Such characteristics are major factors that determine the overall characteristics of the face. Likewise, global characteristics of a face show strong horizontal frequency characteristics based on the basic characteristics of these facial constitutional elements, and energy is concentrated in such a frequency band.

Referring to FIG. 1, the user authentication apparatus 100 includes a frequency converting unit 110, a valid transform coefficient extracting unit 120, a feature vector extracting unit 130, a storage unit 140, a user authentication unit 150, and an energy-concentrated region extracting unit 160.

The frequency converting unit 110 converts a face image in a normalized spatial domain into frequency-domain data. The frequency converting unit 110 may convert the face image into frequency-domain data by using at least one of a Discrete Cosine Transform (DCT) method, a Discrete Sine Transform (DST) method, and a Discrete Fourier Transform (DFT) method.

The valid transform coefficient extracting unit 120 extracts valid transform coefficients from information regarding energy-concentrated regions, the information being included in the frequency-domain data obtained by the frequency converting unit 110.

The feature vector extracting unit 130 extracts a feature vector from the valid transform coefficients extracted by the valid transform coefficient extracting unit 120.

The storage unit 140 stores a feature vector which has been previously registered. The registered feature vector is obtained by performing frequency conversion on a face image of a user, which is received during user registration, by means of the frequency converting unit 110, extracting valid transform coefficients by means of the valid transform coefficient extracting unit 120, and extracting a feature vector from the valid transform coefficients by means of the feature vector extracting unit 130.

The user authentication unit 150 compares the feature vector extracted by the feature vector extracting unit 130 with the feature vector registered with the storage unit 140 so as to perform user authentication. If the extracted feature vector is identical to the registered feature vector, it is reported that user authentication is completed. If the extracted feature vector is not identical, it is reported that user authentication is not completed according to a predetermined method.

A similarity comparison method may be used in comparing the extracted feature vector with the registered feature vector for user authentication. The similarity comparison method includes the Euclidian distance method, the Baysian Classifier method and the Support Vector Machine (SVM) method which have been conventionally used.

The energy-concentrated region extracting unit 160 extracts an energy-concentrated region by using a plurality of prior training face images in order to extract a valid transform coefficient.

Figure 2:
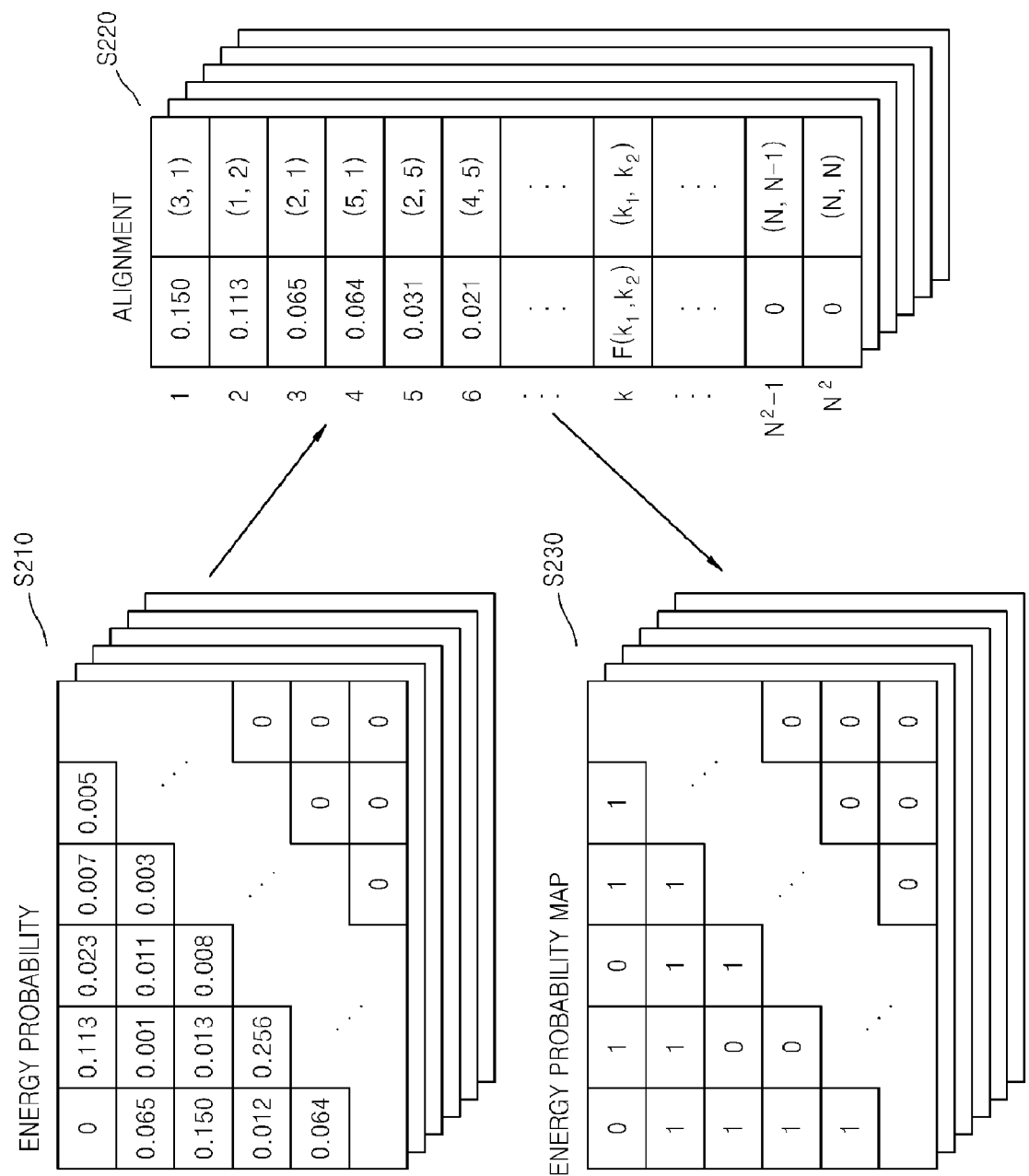
FIG. 2 is a diagram illustrating a process of extracting an energy-concentrated region by an energy-concentrated region extracting unit illustrated in FIG. 1.

An example of a process of extracting an energy-concentrated region is illustrated in FIG. 2.

FIG. 2 is a diagram illustrating a process of extracting an energy-concentrated region by using the energy-concentrated region extracting unit 160 illustrated in FIG. 1 in more detail according to an embodiment of the present invention.

Referring to FIG. 2, first, energy probabilities EPs in individual face images for a plurality of frequency-converted prior training face images are computed (S210).

The energy probabilities EPs are given by:

$$EP(u, v) = \frac{|F(u, v)|^2}{Energy_F}$$

wherein $F(u,v)$ denotes a transform coefficient at coordinates $(u,v)$, and $Energy_F$ denotes the magnitude of energy. Here, two or three low-frequency components including a DC value, which have large energy values may be excluded in computing $EP(u,v)$ and $Energy_P$.

Next, the energy probabilities EPs computed in operation S210 are aligned (S220).

Next, an energy probability map EPM of the face image is obtained by allocating a value of 1 to some of the energy probabilities EPs aligned in operation S220, which are greater than a predetermined value, and by allocating a value of 0 to the remaining energy probabilities EPs, and energy probability maps EPMs of N face images are likewise obtained (S230).

The energy-concentrated region extracting unit 160 extracts an energy-concentrated region having transform coefficients that have a high degree of redundancy from the energy probability maps EPMs of the N face images computed in operation S230.

Alternatively, the energy probability map may be made to show energy probabilities EPs unique to a general human face, instead of an individual person's face, depending on the type of image. In this disclosure, an example of a process of extracting an energy-concentrated region regarding a face image is described, but the present invention is not limited to the above process.

FIG. 3 is a 15×15 table illustrating values obtained by performing a DCT operation on a normalized image applied to the user authentication apparatus of FIG. 1 and rounding off the operation result to a first decimal place, according to an embodiment of the present invention.

Referring to FIG. 3, dark colored blocks indicate energy-concentrated regions, the magnitude coefficients of which are larger than those of the other blocks. Large transform coefficients are distributed around a vertical/horizontal axis of each extracted region, and therefore, there is a large concentration of energy with respect to the large transform coefficients.

Figure 4:
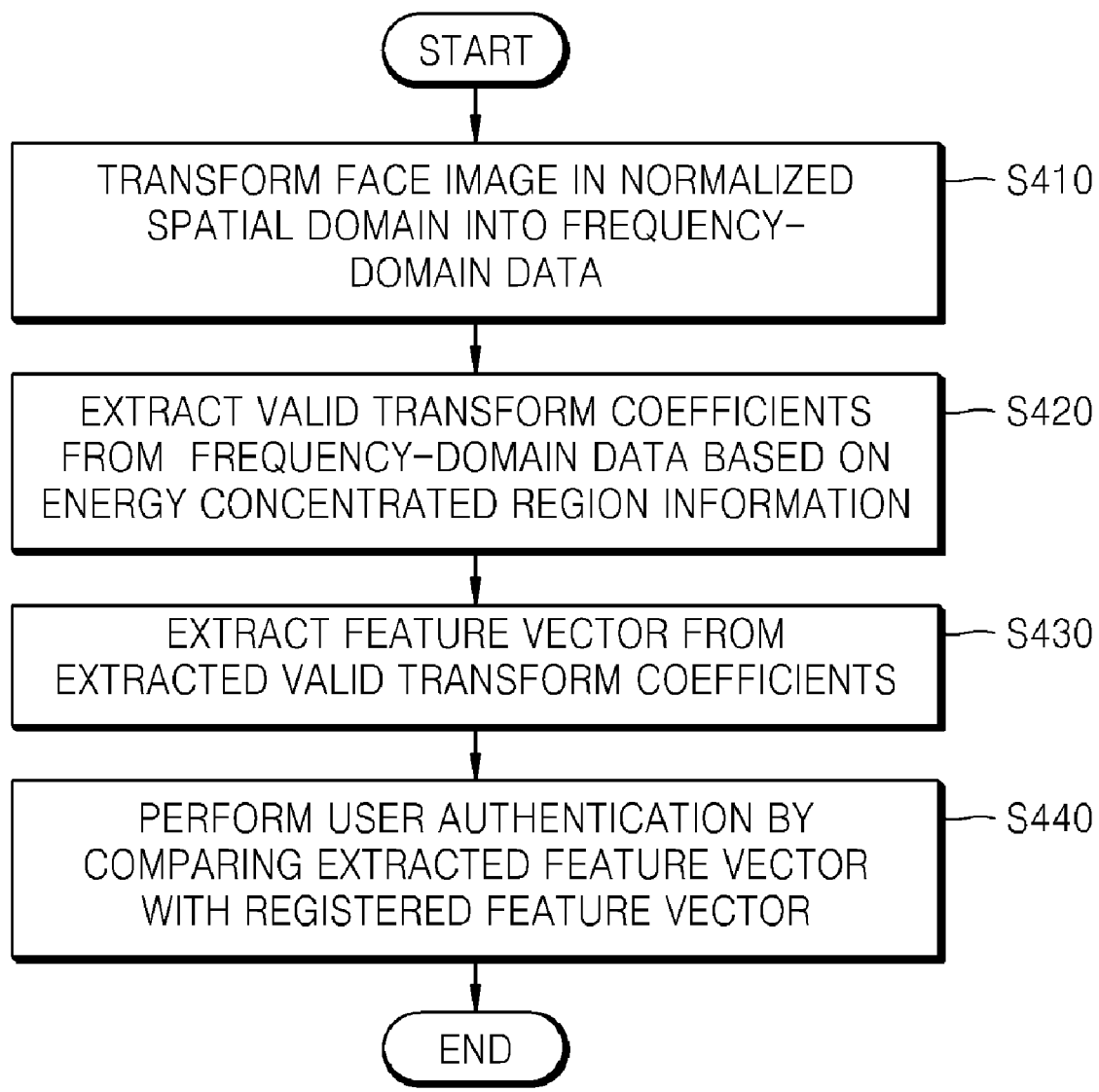
FIG. 4 is a flowchart illustrating a user authentication method using a face image according to an embodiment of the present invention.

FIG. 4 is a flowchart illustrating a user authentication method using a face image according to an embodiment of the present invention.

Referring to FIG. 4, a face image in a normalized spatial domain is transformed into frequency-domain data (S410). Here, at least one of a Discrete Cosine Transform (DCT) method, a Discrete Sine Transform (DST) method, and a Discrete Fourier Transform (DFT) method may be used in order to transform the face image into the frequency-domain data.

Next, valid transform coefficients are extracted from the frequency-domain data obtained in operation S410, based on energy-concentrated region information (S420).

Next, a feature vector is extracted from the valid transform coefficients extracted in operation S420 (S430).

Next, the feature vector extracted in operation S430 and a previously registered feature vector are compared in order to perform user authentication (S440). If the extracted feature vector and the registered feature vector are identical to each other, it is reported that user authentication is completed. If they are not identical to each other, it is reported that user authentication is not completed according to a predetermined method.

A similarity comparison method may be used in comparing the feature vector extracted in operation S430 with the registered feature vector for user authentication. The similarity comparison method includes the Euclidian distance method, the Baysian Classifier method, and the Support Vector Machine (SVM) which are conventionally used.

Although not described here, the operations described with reference to FIGS. 1 through 3 are also applicable to the method of FIG. 4.

Figure 5:
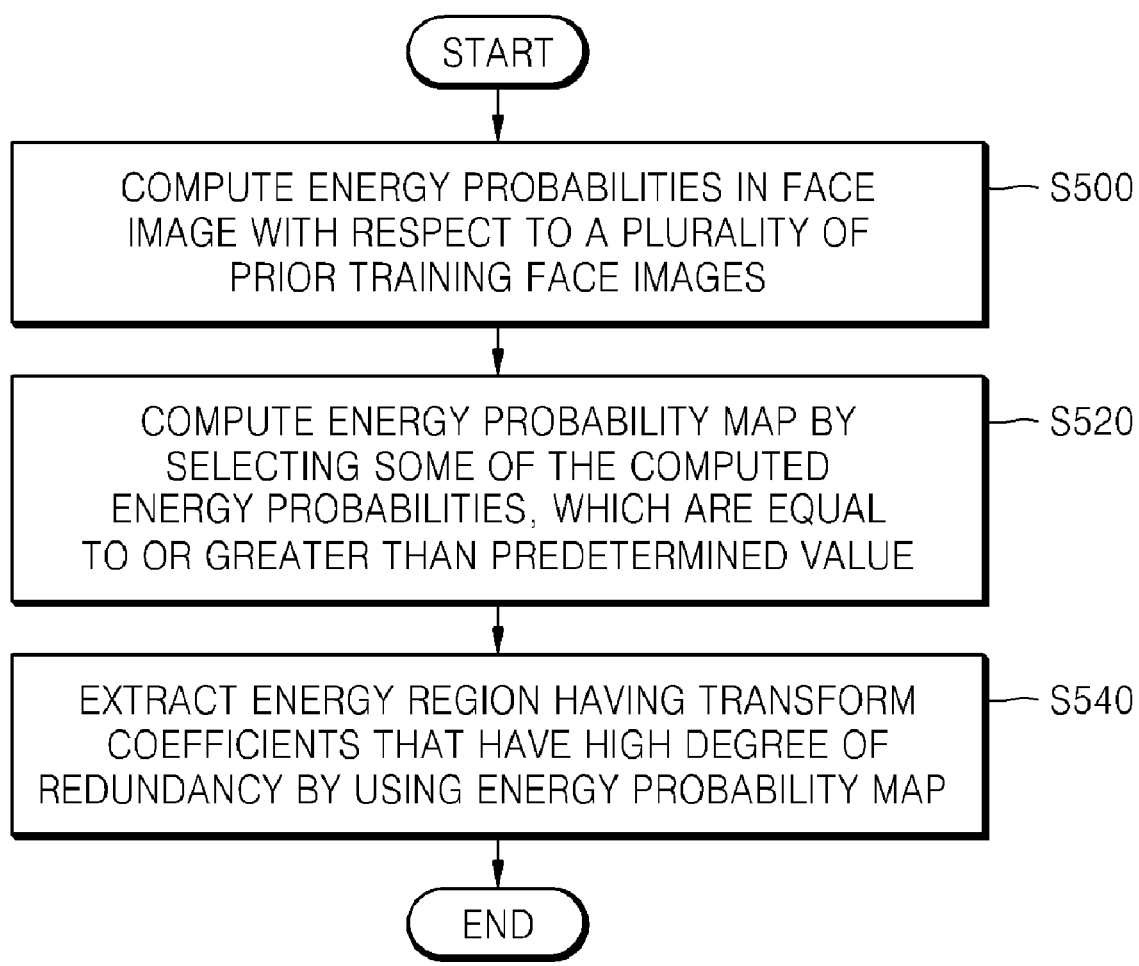
FIG. 5 is a flowchart illustrating a method of extracting an energy-concentrated region according to an embodiment of the present invention.

FIG. 5 is a flowchart illustrating a method of extracting an energy-concentrated region according to an embodiment of the present invention.

Referring to FIG. 5, first, energy probabilities EPs for individual face images with respect to a plurality of prior training face images that are transformed into frequency-domain data, are computed (S500).

The energy probabilities EPs are given by:

$$EP(u, v) = \frac{|F(u, v)|^2}{Energy_F}$$

wherein F(u,v) denotes a transform coefficient at coordinates F(u,v), and $Energy_F$ denotes the magnitude of energy. Here, two or three low-frequency components including a DC value having a large energy value may be excluded in computing EP(u,v) and $Energy_F$.

Next, an energy probability map EPM of the face image is computed by selecting some of the energy probabilities EPs computed in operation S500, which are equal to or greater than a predetermined value (S520).

Next, an energy-concentrated region having transform coefficients that have a high degree of redundancy is extracted by using the energy probability maps EPMs of the face images (S540).

Although not described here, the operations described with reference to FIGS. 1 through 4 are also applicable to the method of FIG. 5.

This application claims the priority of Korean Patent Application No. 10-2006-0037758, filed on Apr. 26, 2006 in the Korean Intellectual Property Office, the disclosure of which is incorporated herein in its entirety by reference.

The present invention can be embodied as computer readable code in a computer readable medium. Here, the computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. Also, the computer readable medium may be a carrier wave that transmits data via the Internet, for example. The computer readable medium can be distributed among computer systems that are interconnected through a network, and the present invention may be stored and implemented as a computer readable code in the distributed system.

While this invention has been particularly shown and described with reference to preferred embodiments thereof, it will be understood by those skilled in the art that various changes in form and details may be made therein without departing from the spirit and scope of the invention as defined by the appended claims.

The invention claimed is:

1. A user authentication method using a face image, comprising:
    (a) transforming a face image in a normalized spatial domain into frequency-domain data;
    (b) extracting valid transform coefficients from the frequency-domain data, based on energy-concentrated region information;
    (c) extracting a feature vector from the extracted valid transform coefficients; and
    (d) performing user authentication by comparing the extracted feature vector with a previously registered feature vector,
    wherein the energy-concentrated region information comprises information regarding an energy concentration region having the transform coefficients with a high degree of redundancy, the energy concentration region being extracted from an energy probability map of the face image;
    extracting a energy-concentrated region having transform coefficients that have a high degree of redundancy by using the energy probability map of the face images.

2. The user authentication method of claim 1, wherein (a) comprises performing at least one of a discrete cosine transform method, a discrete sine transform method, and a discrete Fourier transform method.

3. The user authentication method of claim 1, before (a), further comprising extracting the energy-concentrated region from a plurality of prior training face images in order to extract the valid transform coefficients.

4. The user authentication method of claim 3, wherein the extracting of an energy-concentrated region comprises:
    computing energy probabilities in individual face images for the plurality of the prior training face images which are transformed into frequency-domain data;
    computing an energy probability map of the individual face images by selecting some of the computed energy probabilities which are equal to or greater than a predetermined energy value; and
    extracting the energy-concentrated region having transform coefficients by using the energy probability map.

5. The user authentication method of claim 4, wherein the energy probabilities are given by:

$$EP(u, v) = \frac{|F(u, v)|^2}{Energy_F},$$

wherein F(u,v) denotes a transform coefficient at coordinates (u,v), and $Energy_F$ denotes the magnitude of energy.

6. The user authentication method of claim 1, wherein (c) comprises extracting the feature vector by applying a data analysis method to the valid transform coefficients.

7. A user authentication apparatus using a face image, comprising:
    a frequency converting unit transforming a face image in a normalized spatial domain into frequency-domain data;
    a valid transform coefficient extracting unit extracting valid transform coefficients from the frequency-domain data based on energy-concentrated region information;
    a feature vector extracting unit extracting a feature vector from the extracted valid transform coefficients; and
    a user authentication unit performing user authentication by comparing the extracted feature vector with a previously registered feature vector,
    wherein the energy-concentrated region information comprises information regarding an energy concentration region having the transform coefficients with a high degree of redundancy, the energy concentration region being extracted using an energy probability map of the face image.

8. The user authentication apparatus of claim 7, wherein the frequency converting unit performs at least one of a discrete cosine transform, a discrete sine transform, and a discrete Fourier transform.

9. The user authentication apparatus of claim 7, further comprising an energy-concentrated region extracting unit extracting the energy-concentrated region from a plurality of prior training face images in order to extract the valid transform coefficients.

10. The user authentication apparatus of claim 7, wherein the feature vector extracting unit extracts the feature vector by applying a data analysis method to the valid transform coefficients.

11. A method of extracting an energy-concentrated region, comprising:
 computing energy probabilities in individual face images for a plurality of prior training face images which are transformed into frequency-domain data;
 computing an energy probability map of the individual face images by selecting some of the computed energy probabilities which are equal to or greater than a predetermined energy value; and
 extracting an energy-concentrated region having transform coefficients that have a high degree of redundancy by using the energy probability map.

12. The user authentication apparatus of claim 11, wherein the energy probabilities are given by:

$$EP(u, v) = \frac{|F(u, v)|^2}{Energy_F},$$

wherein $F(u,v)$ denotes a transform coefficient at coordinates $(u,v)$, and $Energy_F$ denotes the magnitude of energy.

13. A non-transitory computer readable medium having recorded thereon a computer program for executing the method of claim 1.

* * * * *